United States Patent
Booth et al.

(10) Patent No.: US 8,583,112 B2
(45) Date of Patent: *Nov. 12, 2013

(54) END USER CONTROLLED TEMPORARY MOBILE PHONE SERVICE DEVICE SWAPPING SYSTEM AND METHOD

(75) Inventors: Kenneth C. Booth, Mesa, AZ (US); Bryce Olson Keeler, Mesa, AZ (US)

(73) Assignee: Klone Mobile, LLC, Tempe, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/585,785

(22) Filed: Aug. 14, 2012

(65) Prior Publication Data

US 2013/0078978 A1    Mar. 28, 2013

Related U.S. Application Data

(63) Continuation-in-part of application No. 13/245,725, filed on Sep. 26, 2011, now Pat. No. 8,244,283.

(51) Int. Cl.
*H04W 8/22* (2009.01)
*H04W 64/00* (2009.01)

(52) U.S. Cl.
USPC ........ 455/433; 455/418; 455/417; 455/456.1; 455/457; 455/435.1

(58) Field of Classification Search
USPC ........... 455/433, 417, 418, 456.1, 457, 435.1, 455/558
See application file for complete search history.

(56) References Cited

U.S. PATENT DOCUMENTS

| | | | |
|---|---|---|---|
| 6,339,745 B1 * | 1/2002 | Novik | 701/431 |
| 2002/0118796 A1 * | 8/2002 | Menard et al. | 379/45 |
| 2006/0140200 A1 | 6/2006 | Black et al. | |
| 2007/0073874 A1 | 3/2007 | Moghaddam et al. | |
| 2008/0125965 A1 * | 5/2008 | Carani et al. | 701/207 |
| 2009/0088142 A1 | 4/2009 | Baribault et al. | |
| 2009/0328136 A1 | 12/2009 | Wan et al. | |
| 2010/0210304 A1 * | 8/2010 | Huslak | 455/558 |
| 2011/0264246 A1 * | 10/2011 | Pantoja et al. | 700/92 |

FOREIGN PATENT DOCUMENTS

WO    WO2010088098    8/2010

OTHER PUBLICATIONS

Phone Power Two Port Home Adapter; www.power.com/hardware.aspx, Jun. 18, 2012.

Chang, Darius, Are you paying too much for SingTel's Multi-SIM plan?, CNET Asia, 2001, www.asia.cnet.com/are-you-paying-too-much-for-singtels-multi-sim-plan-62113011.htm, Oct. 27, 2010.

(Continued)

*Primary Examiner* — Meless N Zewdu
*Assistant Examiner* — Jean Chang
(74) *Attorney, Agent, or Firm* — Booth Udall Fuller, PLC

(57) ABSTRACT

User controlled temporary mobile phone and/or data service device swapping systems and methods including particular implementations and embodiments comprising a plurality of mobile phone user control accounts at least a first telephone number or other registration number registered with each of the plurality of phone service or cellular service user control accounts, and at least two different phone devices registered with each of the plurality of user control accounts, and a mobile phone user interface configured to receive input from the mobile phone user to indicate which of the at least two different mobile phone or cellular devices associated with the mobile phone user control account is to be associated and to transmit data indicating the association to a phone number or other service access number registry.

24 Claims, 7 Drawing Sheets

(56) References Cited

OTHER PUBLICATIONS https://developer.opencloud.com/devportal/display/OCDEV/Multi-SIM, Jun. 18, 2012.
ANAM Technologies Ltd, Multi-SIM, 2012, Ireland, www.anam.com/multisim.php, Jun. 18, 2012.
www.orange.ro/corporate/solutii-business/multi-sim.html, Jun. 18, 2012.
Opencode Mobile Network Systems, Multi-Sim System, 2012, www.opencode.com/solutions-1-17.php, Jun. 18, 2012.
Starhub, Do more at the same time with dual SIM cards, 2012, www.starhub.com/business/mobile/valueaddedservices/optionalvas/multisim.html, Jun. 18, 2012.
Polarm Technologies, Shop That Matters, 2012, www.polarmtech.com/product/12-in-1-multi-sim-card, Jun. 18, 2012.
www.maxis.com.my/personal/latest/promo/m1lsm_intro.asp, Jun. 18, 2012.
http://www.vipnet.hr/en/privatni-pretplatnici/pozivi/multisim, Jun. 18, 2012.

* cited by examiner

END USER CONTROLLED TEMPORARY MOBILE PHONE SERVICE DEVICE SWAPPING SYSTEM AND METHOD

CROSS REFERENCE TO RELATED APPLICATIONS

This document claims the benefit of the filing date of U.S. patent application Ser. No. 13/245,725 entitled "END USER CONTROLLED TEMPORARY MOBILE PHONE SERVICE DEVICE SWAPPING SYSTEM AND METHOD" to Kenneth C. Booth which was filed on Sep. 26, 2011 and which issues as U.S. Pat. No. 8,244,283 on Aug. 14, 2012, the contents of all of which are hereby incorporated by reference.

BACKGROUND

1. Technical Field

Aspects of this document relate generally to phone and data end user interfaces and phone and data systems and techniques for pushing or swapping phone service to a different physical end-user phone.

2. Background Art

Telephone and data communication has become a required feature in the lives of people in industrialized countries. However, when users go to purchase a phone, they are generally of the mindset that they are picking "the phone" needed for their intended use and that they are stuck with that phone and its features until they purchase a new phone to replace the previous phone. As a result, purchasers generally over-purchase their phone so that it does everything the user can conceive they will ever need the phone to do for the next 2-4 years until a replacement phone is purchased. When picking data access devices, such as tablets and laptop computers, it is generally expected that the device will have its own account for accessing a cellular network data stream, the Internet and data communications or will be enabled with Wi-Fi access hardware.

Particularly with purchasing mobile phones, phone purchasers, if they can afford it, generally purchase a smart phone with processor capability that is further expanded through the use of downloadable applications to expand the functionality of the device. Where phone purchasers run into problems, however, is that their ultimate phone is generally not intended for use during all activities. Due to the cost of a smart phone, many users do not want to use their expensive smart phone during many activities due to the risk of physical damage, water damage, loss or theft. Some activities do not make carrying a relatively large smart phone convenient.

For data access devices, a user is currently required to sign up for a cellular data network account for the specific device, with an associated monthly fee, to give the device access to the cellular data stream.

SUMMARY

Aspects of the disclosure relate to a user controlled temporary cellular data service device swapping system comprising a plurality of cellular data service user control accounts on a user controlled cellular data service device swapping system accessible through an Internet connection to a cellular data service user interface accessible through each of a plurality of processors each under control of a different cellular data service user, each different cellular data service user associated with a different cellular data service user control account, at least one cellular data access registration number associated with each of the plurality of cellular data service user control accounts, each cellular data service user control account associated with a different cellular data access registration number than each other cellular data service user control account, and at least two different cellular data access devices registered with each of the plurality of cellular data access user control accounts, each of the at least two different cellular data access devices comprising a cellular data network access component that provisions data network communication through a cellular data communication network and a unique identifier different from unique identifiers associated with each of the at least two different cellular data access devices registered with each of the other cellular data service user control accounts of the plurality of cellular data service user control accounts, wherein the cellular data service user interface is configured to receive input from the cellular data service user associated with the cellular data service user control account to indicate which of the at least two different cellular data access devices associated with the cellular data service user control account is to be associated with a first of the at least one cellular data access registration number associated with the user control account and to transmit data indicating the association to a service provider's cellular data access registration number registry.

Particular embodiments and implementations may comprise one or more of the following. A second cellular data access registration number associated with one of the cellular data service user control accounts, wherein the interface is configured to receive input from the cellular data service user associated with the user control account to indicate which of the at least two different cellular data access devices associated with the cellular data service user control account is to be associated with the second cellular data access registration number and to transmit data indicating the new association to the service provider's cellular data access registration number registry. At least one of the two different cellular data access devices registered with at least one of the plurality of cellular data service user control accounts may not be actively associated with any cellular data access registration number. Each of the at least two different cellular data access devices may comprise one of a cellular telephone, a voice over IP mobile phone device, a SIM chip, a tracking device, a watch phone, a personal computing device, a video phone device, a smart phone, a global positioning system locator, a data transmitter, and a cellular chip. The cellular data service user interface may be configured to receive the input and transmit the data even when the indicated cellular data access device is located remote from the cellular data service user. At least one of the at least two different cellular data access devices may comprise a location tracking device and the interface is configured to illustrate a location on a map displayed on a computer display an approximate location of the location tracking device. At least one of the at least two different cellular data access devices may comprise a location tracking device, and the interface is configured to provide the indication from the cellular data service user on a scheduled basis to select the location tracking device for association with the at least one cellular data access registration number and gather data from about a location of the location tracking device as it is associated with the at least one cellular data access registration number. The at least two different cellular data access devices comprises a plurality of location tracking devices located remotely from each other, and the interface is configured to provide the indication from the cellular data service user to select each of the plurality of location tracking devices in succession for association with the at least one cellular data access registration number and gather data from about a location of each of the plurality of location tracking devices as it is associated with the at least one cellular data access registration number. At least one of the at least two different cellular data access devices may comprise a data transmitter located remotely from the cellular data service user, and the interface may be configured to automatically periodically provide the indication from the cellular data service user to select the data transmitter for association with the at least one cellular data access registration number and to receive data from the data transmitter as it is associated with the at least one cellular data access registration number. At least two different cellular data access devices may comprise a plurality of data transmitters located remotely from each other, and the interface may be configured to automatically provide the indication from the cellular data service user to select each of the plurality of data transmitters in succession for association with the at least one cellular data access registration number and receive data from each of the plurality of data transmitters as it is associated with the at least one cellular data access registration number.

Other aspects of the disclosure relate to a method of swapping user controlled temporary cellular data service from a first user device to a second user device, the method comprising associating at least a first cellular data access registration number and its attendant cellular data service, and at least two cellular data devices with each of a plurality of cellular data service user control accounts associated with a user controlled temporary cellular data service swapping system, receiving input from a first cellular data service user associated with a first cellular data service user control account among the plurality of cellular data service user control accounts, the input indicating which of the at least two different cellular data access devices associated with the cellular data service user control account is to be associated with the first cellular data access registration number associated with the user control account, dissociating the first cellular data access registration number and at least a portion of its attendant cellular data service from its association with a second of the at least two different cellular data access devices if the first cellular data access registration number is associated with the second cellular data access device prior to receiving the input from the first cellular data service user, and transmitting data to a service provider's cellular data access registration number registry to indicate that the first cellular data access registration number and at least a portion of its attendant cellular data access service is to be associated with the first cellular data access device.

Particular implementations and embodiments may comprise one or more of the following. Receiving input from the first cellular data service user may comprise receiving the input through a communication medium other than the cellular data access device indicated for association with the first cellular data access registration number. Receiving input from the first cellular data service user may further comprise receiving the input when the cellular data access device indicated for association with the first cellular data access registration number is remote from the first cellular data service user. Identifying a location of each of the at least two different cellular data access devices by associating the first cellular data access registration number with a first of the at least two different cellular data access devices, identifying the location of the first cellular data device and recording the location, then associating the first cellular data access registration number with the second of the at least two different cellular data access devices, identifying the location of the second cellular data access device and recording the location. Identifying the location of each of the at least two different cellular data access devices may be done automatically on a scheduled basis. Identifying the location may comprise automatically identifying the location on a scheduled basis and storing the recorded locations in memory. Notifying the first cellular data service user if the identified location of either the first or the second cellular data access device was identified as being outside a predetermined geographic boundary for either the first or the second cellular data access device. Associating at least a second cellular data access registration number with the first cellular data service user control account. Receiving input through the second cellular data access device while the phone number is associated with the first cellular data access device and associating the second cellular data access device with the cellular data access registration number and at least a portion of its attendant cellular data service. A plurality of the at least two different cellular data access devices may comprise a plurality of remotely located cellular data transmitters, the method further comprising automatically providing the indication from the cellular data service user to select each of the plurality of cellular data transmitters in succession for association with the at least one cellular data access registration number and receiving data from each of the plurality of remotely located data transmitters as it is associated with the at least one cellular data access registration number.

Other aspects of the disclosure relate to a user controlled temporary cellular data service device swapping system comprising a plurality of cellular service user control accounts on a user controlled cellular service device swapping system accessible through an Internet connection to an online cellular service user interface, a different at least a first cellular access registration number associated with each of the plurality of cellular service user control accounts, and at least two different cellular devices registered with each of the plurality of mobile cellular service user control accounts, each of the at least two different cellular devices comprising a cellular communication component that provisions cellular device communication through a cellular communication network, and a unique identifier different from unique identifiers associated with each of the at least two different cellular devices registered with each of the other cellular service user control accounts, wherein the user controlled cellular service device swapping system is configured to receive input from a first cellular device user associated with a first cellular service user control account of the plurality of mobile cellular service user control accounts to indicate that a first cellular device of the at least two different cellular devices is to be associated with the first cellular access registration number and to transmit data indicating the association to a service provider's cellular service access number registry.

Particular implementations and embodiments may comprise one or more of the following. The at least two different cellular devices may comprise at least two different cellular phone devices and the at least a first cellular access registration number comprises at least a first telephone number. Each of the at least two different cellular devices may comprise one of a cellular telephone, a voice over IP mobile phone device, a SIM chip, a tracking device, a watch phone, a personal computing device, a video phone device, a smart phone and a cellular chip. The user controlled cellular service device swapping system may be configured to receive the input and transmit the data even when the indicated cellular device is located remote from the cellular service user. At least one of the at least two cellular devices may comprise a tracking device and the interface is configured to automatically locate and record a location of the tracking device on a scheduled basis.

Aspects of the present disclosure relate to a user controlled temporary mobile phone service device swapping system comprising a plurality of cellular phone user control accounts on a user controlled mobile phone service device swapping system accessible through an Internet connection to a cellular phone user interface accessible through each of a plurality of processors each under control of a different cellular phone user, each different cellular phone user associated with a different cellular phone user control account, at least a first telephone number registered with each of the plurality of cellular phone user control accounts, each cellular phone user control account associated with a different first telephone number than each other cellular phone user control account, and at least two different mobile phone devices registered with each of the plurality of cellular phone user control accounts, each of the at least two different mobile phone devices comprising a mobile phone component that provisions mobile phone communication through a mobile phone telecommunication network and a unique identifier different from unique identifiers associated with each of the at least two different mobile phone devices registered with each of the other cellular phone user control accounts of the plurality of cellular phone user control accounts; wherein the cellular phone user interface is configured to receive input from the cellular phone user associated with the cellular phone user control account to indicate which of the at least two different mobile phone devices associated with the cellular phone user control account is to be associated with the first telephone number associated with the user control account and to transmit data indicating the association to a phone number registry.

Particular embodiments and implementations of the disclosure may include one or more of the following. The system may further comprise a second telephone number registered with at least one of the cellular phone user control accounts, wherein the interface is configured to receive input from the cellular phone user associated with the user control account to indicate which of the at least two different mobile phone devices associated with the cellular phone user control account is to be associated with the second telephone number and to transmit data indicating the new association to a phone number registry. At least one of the two different cellular phone devices registered with at least one of the plurality of cellular phone user control accounts may not associated with any telephone number. Each of the at least two different mobile phone devices may comprise one of a cellular telephone, a voice over IP mobile phone device, a SIM chip, a tracking device, a watch phone, a personal computing device, a video phone device, a smart phone and a cellular chip. The cellular phone user interface may be configured to receive the input and transmit the data even when the indicated mobile phone device is located remote from the cellular phone user. At least one of the at least two different mobile phone devices may comprise a tracking device and the interface is configured to illustrate a location on a map displayed on a computer display an approximate location of the tracking device. The interface may be further configured to automatically locate and record a location of the tracking device on a scheduled basis.

According to another aspect, a method of swapping user controlled temporary mobile phone service from a first user device to a second user device may comprise associating at least a first telephone number and its attendant phone service, and at least two mobile phone devices with each of a plurality of cellular phone user control accounts associated with a user controlled temporary mobile phone service swapping system, receiving input from a first cellular phone user associated with a first cellular phone user control account among the plurality of cellular phone user control accounts, the input indicating which of the at least two different mobile phone devices associated with the cellular phone user control account is to be associated with a first telephone number associated with the user control account, dissociating the first telephone number and at least a portion of its attendant phone service from its association with a second of the at least two different mobile phone devices if the first telephone number is associated with the second mobile phone device prior to receiving the input from the first mobile phone user, and transmitting data to a phone number registry indicating to indicate that the first telephone number and at least a portion of its attendant phone service is associated with the first mobile phone device.

Particular implementations and embodiments of the disclosure may comprise one or more of the following. Receiving input from the first cellular phone user may comprise receiving the input through a communication medium other than the mobile phone device indicated for association with the first telephone number. Receiving input from the first cellular phone user further may comprise receiving the input when the mobile phone device indicated for association with the first telephone number is remote from the first cellular phone user. Identifying a location of each of the at least two different mobile phone devices may be accomplished by associating the first telephone number with a first of the at least two different mobile phone devices, identifying the location of the first mobile phone device and recording the location, then associating the first telephone number with the second of the at least two different mobile phone devices, identifying the location of the second mobile phone device and recording the location. Identifying the location may comprise automatically identifying the location on a scheduled basis and storing the recorded locations in memory for later display. The system may immediately notify the first cellular phone user if the identified location of either the first or the second mobile phone device was identified as being outside a predetermined geographic boundary for either the first or the second mobile phone device. Associating at least a second telephone number with the first cellular phone user account. Associating at least a third mobile phone device with the first cellular phone user account. Receiving input through the second mobile phone device while the phone number is associated with the first mobile phone device, the input causing the user controlled temporary mobile phone service swapping system to associate the second cellular phone device with the phone number and at least a portion of its attendant phone service.

According to another aspect of the present disclosure, a user controlled temporary mobile phone service device swapping system may comprise a plurality of mobile phone user control accounts on a user controlled mobile phone service device swapping system accessible through an Internet connection to an online phone user interface, a different at least a first telephone number registered with each of the plurality of mobile phone user control accounts, and at least two different mobile phone devices registered with each of the plurality of mobile phone user control accounts, each of the at least two different mobile phone devices comprising a mobile phone component that provisions mobile phone communication through a mobile phone telecommunication network, and a unique identifier different from unique identifiers associated with each of the at least two different mobile phone devices registered with each of the other mobile phone user control accounts, wherein the user controlled mobile phone service device swapping system is configured to receive input from a first mobile phone user associated with a first mobile phone user control account of the plurality of mobile phone user control accounts to indicate that a first mobile phone device of the at least two different mobile phone devices is to be associated with the first telephone number and to transmit data indicating the association to a phone number registry.

Particular implementations and embodiments of the disclosure may comprise one or more of the following. A second telephone number may be registered with the first mobile phone user control account, wherein the user controlled mobile phone service device swapping system is configured to receive input through the first mobile phone user control account to indicate which of the at least two different mobile phone devices associated with the first phone user control account is to be associated with the second telephone number, and to transmit data indicating the new association to a phone number registry. At least one of the two different mobile phone devices may be with at least one of the plurality of mobile phone user control accounts is not associated with any telephone number. Each of the at least two mobile phone devices may comprise one of a cellular telephone, a voice over IP mobile phone device, a SIM chip, a tracking device, a watch phone, a personal computing device, a video phone device, a smart phone and a cellular chip. The user controlled mobile phone service device swapping system may be configured to receive the input and transmit the data even when the indicated mobile phone device is located remote from the mobile phone user. At least one of the at least two mobile phone devices may comprise a tracking device and the interface is configured to illustrate a location on a map displayed on a computer display an approximate location of the tracking device. The interface may further be configured to automatically locate and record a location of the tracking device on a scheduled basis.

According to yet another aspect of the disclosure, a user controlled temporary communication service device swapping system may comprise a plurality of communications device user control accounts on a user controlled communication service device swapping system accessible through an Internet connection to an online communications user interface, a different at least a first communications device number registered with each of the plurality of communications user control accounts, and at least two different communications devices registered with each of the plurality of communications user control accounts, each of the at least two different communications devices comprising a communications component that provisions communication through a communications network, and a unique identifier different from unique identifiers associated with each of the at least two different communications devices registered with each of the other communications user control accounts, wherein the user controlled communications service device swapping system is configured to receive input from a first communications user associated with a first communications user control account of the plurality of communications user control accounts to indicate that a first communications device of the at least two different communications devices is to be associated with the first communications device number and to transmit data indicating the association to a communication number registry.

Particular implementations and embodiments of the disclosure may comprise one or more of the following. A second communication number may be registered with the first communications user control account, wherein the user controlled communications service device swapping system is configured to receive input through the first communications user control account to indicate which of the at least two different communications devices associated with the first communications user control account is to be associated with the second communications device number, and to transmit data indicating the new association to a communication number registry. Each of the at least two communications devices may comprise one of a cellular telephone, a voice over IP mobile phone device, a SIM chip, a tracking device, a watch phone, a personal computing device, a video phone device, a smart phone and a cellular chip. The user controlled communications service device swapping system may be configured to receive the input and transmit the data even when the indicated communications device is located remote from the communications device user.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special"definition of that term and explain how it differs from the plain and ordinary meaning Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. §112, ¶6. Thus, the use of the words "function," "means" or "step" in the Description , Drawings, or Claims is not intended to somehow indicate a desire to invoke the special provisions of 35 U.S.C. §112, ¶6, to define the invention. To the contrary, if the provisions of 35 U.S.C. §112, ¶6 are sought to be invoked to define the claimed disclosure, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. §112, ¶6. Moreover, even if the provisions of 35 U.S.C. §112, ¶6 are invoked to define the claimed disclosure, it is intended that the disclosure not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

Figure 1:
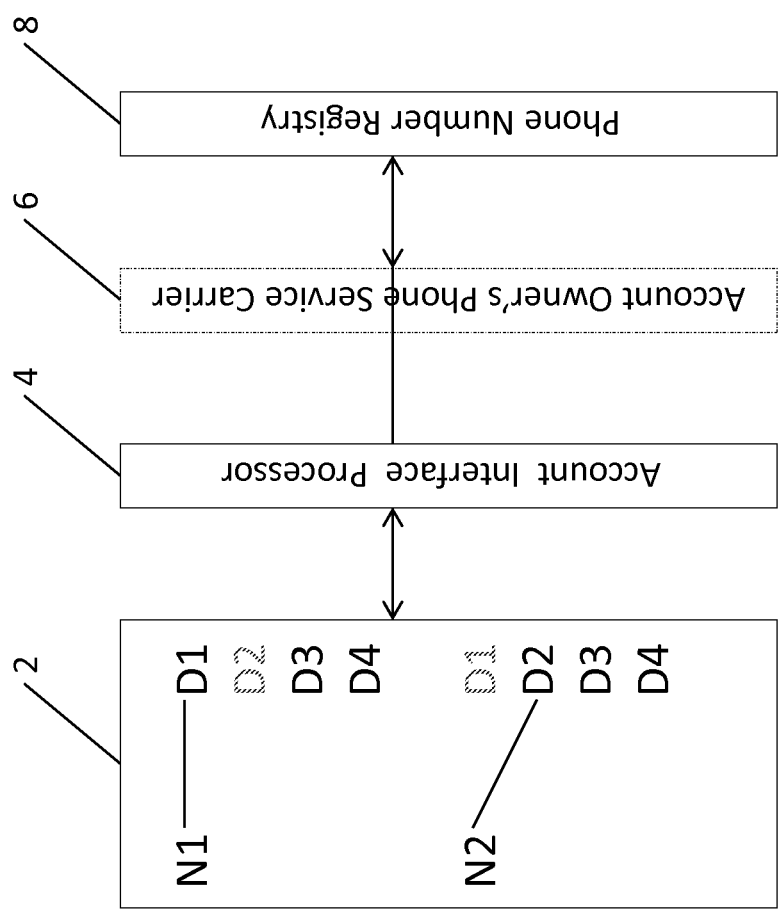
FIG. 1 is a block diagram of an account owner's interface with a phone number registry.

This disclosure, its aspects and implementations, are not limited to the specific phone or other device types, communications technologies, networks or other system component examples, or methods disclosed herein. Many additional components and assembly procedures known in the art consistent with multiple phone and/or data devices associated with a single phone or registration number through an account owner-controlled account interface are contemplated for use with particular implementations from this disclosure. Accordingly, for example, although particular implementations are disclosed, such implementations and implementing components may comprise any components, models, versions, quantities, and/or the like as is known in the art for such systems and implementing components, consistent with the intended operation.

The public switched telephone network, which includes a phone number registry service, includes a registry of all phone numbers in the United States. Other inter-related systems maintain a registry of phone numbers in other countries of the world. Each phone number is assigned, initially, to a phone carrier who maintains a record of which physical location, in the case of stationary phones, or which specific mobile phone device is associated with the phone number. For mobile phones, when a call is made from a first physical phone device, the number requested is sent to the first phone's carrier which looks up the identity of the second physical phone device from the phone number registry service and routes the call accordingly through, for example, a cellular tower near the second physical phone device to make the connection. Only one physical phone device can be associated with a particular phone number in the phone number registry. There are services, such as call forwarding, which will cause a call coming in to a first physical phone device through its phone number to be forwarded to a second physical phone device through a second phone number. However, if the second physical phone device returns a call back to the original caller, it will come from the second phone number and may not be recognized by the original caller (who called a different first phone number). This may complicate communication between two people or cause additional calls to be missed in managing multiple phone numbers. It should be made clear that as referred to herein, "phone number" refers to the conventional telephone number one dials to call someone and not to any product identification number, serial number or other number programmed into or stored in the memory or hardware of the physical phone device.

A similar registry for each phone carrier (storing cellular data access registration numbers) may be maintained for reference in authorizing cellular data devices to access the cellular data network for a particular carrier, which may include authorization for that carrier's customers to access the cellular data network of other carriers. Where the cellular data device is also a cellular phone, the cellular data access registration number may be the phone number. Where the cellular data device is not also a cellular phone with an associated phone number or in other cases depending upon the preferences of the service provider, the cellular data access registration number may have its own numbering system.

As used herein, the term "physical phone device" and the more specific terms "cellular phone device" and "cellular device" are intended to refer to the tangible phones or other communication or data devices which have a unique identifier associated with it to allow a cellular service carrier to know where the cellular device is by tracking that cellular device's unique identifier and its connection to surrounding communication technology (whether it be wireless or wired technology). In its simplest form, a cellular device does not even require a speaker or microphone, but only a cellular chip and an ability to communicate with a cellular network for tracking its location. For a "land line" or conventional house phone or office phone which is hard wired to a phone network, that unique identifier is established through a switch box located near the address of the property.

"Phone number" refers to the conventional telephone number dialed on a physical phone device to make a connection with another party, typically a 10 or 11 digit number in the United States, and not to any product identification number, serial number or other hardware identification number or SIM identification number. A "cellular data access registration number" may comprise a phone number or some other numeric, alpha or alphanumeric number associated with a user's account to distinguish it from other user accounts. "Unique identification number" or "unique identifier," as used here, refers to the physical phone device identification number associated with the physical phone device hardware. For a cellular device, that unique identifier is coded into a subscriber identification module ("SIM") chip or other memory or hardware of the physical device. For a Voice over IP phone device, a unique identifier is coded into the memory or other storage device of the physical phone or other hardware. Alternatively, for any physical phone device, the unique identifier could be hard-coded into the circuitry of the physical phone device's connection to the network. "Phone service" refers to the service provided by the phone service carrier that is routed to the physical phone device to enable it to make and receive calls through the phone number assigned to the physical phone device through the phone number registry. "Cellular service" refers to any phone service or cellular data service provided by a service carrier that is routed to the physical device to enable it to make and receive calls or to access a cellular data network.

If a cellular phone user desires to use a different cellular phone device, a physical change may be made to the cellular device to cause the phone number registry service to route calls to the second physical phone device. In some cases, particularly in cellular phone devices, the service provider identifies the physical phone device to which a call should be routed by the unique identification number assigned to the SIM chip within the cellular phone device and that SIM chip may be moveable between cellular phone devices to cause calls associated with the phone number assigned to the unique identifier of the SIM chip to also be routed to the new device. If the cellular user's plan also included cellular data access, this physical movement of the SIM chip also typically transfers the user's data plan as well. One downside associated with the requirement to physically move the SIM chip is that generally the phone must be dismantled and the phone battery must be removed to access the chip, exposing the insides of the phone to contaminants and increased risk of harm in the process. Another downside is that both phones must be physically present with the user to move the SIM chip from one phone to the other.

Another approach to change a phone number from one physical phone device to another is typically done at a cellular phone store by a store employee with access to the phone number registry service database. The store employee is able to associate a second phone and its unique identification number with a phone number that was previously associated with a first phone and its unique identification number and at the same time dissociate the first phone from the phone number. The process again, however, requires the physical presence of the second phone for the transfer to work, and further involves a store employee for assistance. Another approach used by some service providers is similar to the store employee process and involves a user calling their phone service carrier through the second physical phone device to a customer service number and requesting that the phone service carrier associate the second physical phone device the user is calling from with the phone number associated with the user's account. This process, too, requires the physical presence of the second physical phone device with the account owner to associate it with the account owner's phone number on the account.

Various embodiments of the present cellular system and methods involve systems, interfaces and methods for securely permitting an phone number or other cellular service account owner to select from a list which temporary physical phone or other device is to be associated with the account owner's phone number or account number. In some embodiments, the account owner selects which of the account owner's phone numbers will be associated with which of the account owner's physical phone or other devices and permits the account owner to swap them at will to push phone or data service to any of the physical phone or other devices on the list whether the physical device is in the presence of the account owner or not. Aspects of this disclosure relate to interfaces, functionality and possibilities for a system for permitting a mobile phone or data service carrier customer who has an online physical phone or data device swapping account to swap which temporary physical phone or data device is associated with the customer's mobile phone or data service.

According to a first aspect, an example of which is illustrated in FIG. 1, a much simplified example of an account owner interface 2 is provided, through a secure Internet web site through a personal computing device, smart phone application and/or dial-up phone network, which is associated with an account owner's password protected account. Although this example could also be used to illustrate a data service and many phone and data services are integrally associated at a service carrier, FIG. 5 has been provided to specifically illustrate a data account owner interface that is not necessarily specifically associated with a phone service plan.

As used herein, an "account owner" is someone who has control access to an account which is associated with one or more phone numbers and/or one or more data access registration numbers and one or more physical phone, data or other devices owned or controlled by the account owner, such as through being a phone or data service carrier customer or by having a phone or registration number of another phone or data service carrier customer assigned to their use. A cellular phone service account owner may associate one or more of the account owner's phone numbers N1, N2 with the account and may associate one or more cellular phone devices D1, D2, D3, D4 with the account by entering the unique identification number(s) of each cellular phone device D1, D2, D3, D4 into the interface, or by some other convenient method known in the art, such as by electronically requesting or receiving the unique identification number(s) through direct communication with each cellular phone device. Initially, each phone number N1, N2 is associated with a particular physical cellular device D1, D2, D3 or D4 through the phone number registry service. By selecting a different physical cellular device D1, D2, D3, D4 to associate with a particular one of the one or more phone numbers N1, N2 associated with the account owner's account, however, the account owner is permitted to change, at the account owner's option, the physical cellular phone device D1, D2, D3, D4 associated with the account owner's phone number N1, N2 on the phone number registry service. Through the interface, the user selects which cellular phone device D1, D2, D3, D4 to associate with a particular phone number N1, N2 and submits that change request to the interface processor 4. The interface processor may be any network server or central server comprising a computer processor and software or hardware configured to process requests and associated with a database adapted to store the respective cellular phone device numbers D1, D2, D3, D4 and the respective account owner's phone numbers N1, N2. Those of ordinary skill in the art will readily understand the scope of what is available and possible for this interface from the present disclosure.

In the non-limiting example of FIG. 1, the first phone number N1 is associated with the first cellular phone device D1, and the second phone number N2 is associated with the second cellular phone device D2. The change request is transmitted to the phone number registry service 8, either directly or through the account owner's phone service carrier 6, and the change is made. All calls coming to that phone number are thereafter automatically routed to the new cellular phone devices selected for association with the numbers and all calls made from those cellular phone devices reflect the phone number associated with the particular cellular phone device in the user's account. If the account owner changes his or her mind, the account owner can again interact with the interface 2 and select a different physical phone device D1, D2, D3, D4 to associate with each phone number N1, N2. When calls come in for the account owner's phone number N1, N2, because the phone device D1, D2, D3, D4 associated with the phone number N1, N2 has been changed in the phone number register 8, or at least with the account owner's phone service carrier 6, the calls can immediately be routed directly to the appropriate phone device D1, D2, D3, D4 through an appropriate Communications Network 7. It should be understood that the account owner's access to the account owner's interface 2 may be through one of the phone devices D1, D2, D3, D4 associated with the account owner's account through a phone dial-up interface or a smart phone app, or even simply through Internet access through the phone device, or through any other Internet access device known. Although the particular example above illustrates two phone numbers associated with the account, it is contemplated that in many, if not most, applications, an account interface may have only a single phone number that is being switched between the various cellular phone devices. This single phone number embodiment, however, is merely a simpler version of the embodiment described in relation to FIG. 1.

Figure 5:
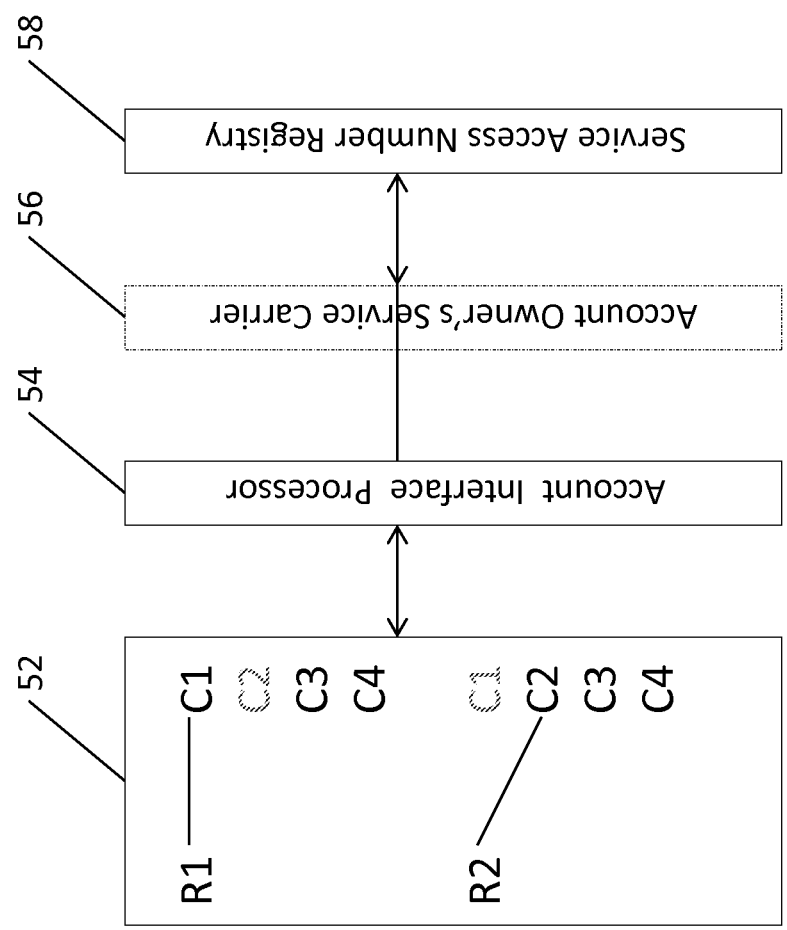
FIG. 5 is a block diagram of an account owner's interface with a cellular data service access registration number registry.

According to a second aspect, an example of which is illustrated in FIG. 5, a much simplified example of an account owner interface 52 is provided, through a secure Internet web site through a personal computing device, smart phone application and/or dial-up phone network, which is associated with an account owner's password protected account. This example is specifically used to illustrate a data service, though many data services are typically integrated with phone service at a service carrier. The system and description illustrated in relation to FIG. 1 may be implemented or the system described here as the operation of each is very similar and differs, among other ways, by where the account owner's identifying number giving access to the service is stored for the plan they have been granted access to by the service carrier. Although it is anticipated that this is primarily related to the data portion of a cellular phone network, it will be understood by those of ordinary skill in the art that there are other data networks in the art for which a similar operation and service swapping system may be used.

A cellular data service user control account owner may associate one or more of the account owner's cellular data access registration number R1, R2 with the account and may associate one or more cellular data devices C1, C2, C3, C4 with the account by entering the unique identification number (s) of each cellular data device C1, C2, C3, C4 into the interface, or by some other convenient method known in the art, such as by electronically requesting or receiving the unique identification number(s) through direct communication with each cellular data device (also elsewhere herein included as a cellular phone device). Initially, each cellular data access registration number R1,R2 is associated with a particular physical cellular device C1, C2, C3 or C4 through a cellular data service number registry, such as the phone number registry service. Similar to the phone number registry service, a cellular data service number registry enables the data service carriers to know, through looking up the information in a database associated with the system, whether a particular data service device is authorized to access the data service whether associated with that service carrier's particular service or another partner carrier's service.

By selecting a different physical cellular data device C1, C2, C3, C4 to associate with a particular one of the one or more registration numbers R1, R2 associated with the account owner's account, however, the account owner is permitted to change, at the account owner's option, the physical cellular data device C1, C2, C3, C4 associated with the account owner's cellular data service access number R1, R2 on the cellular data service number registry service. Through the interface, the user selects which cellular data device C1, C2, C3, C4 to associate with a particular cellular data service registration number R1, R2 and submits that change request to the interface processor 54. The interface processor may be any network server or central server comprising a computer processor and software or hardware configured to process requests and associated with a database adapted to store the respective cellular data device numbers C1, C2, C3, C4 and the respective account owner's cellular data service access registration numbers R1, R2. Those of ordinary skill in the art will readily understand the scope of what is available and possible for this interface from the present disclosure.

Figure 2:
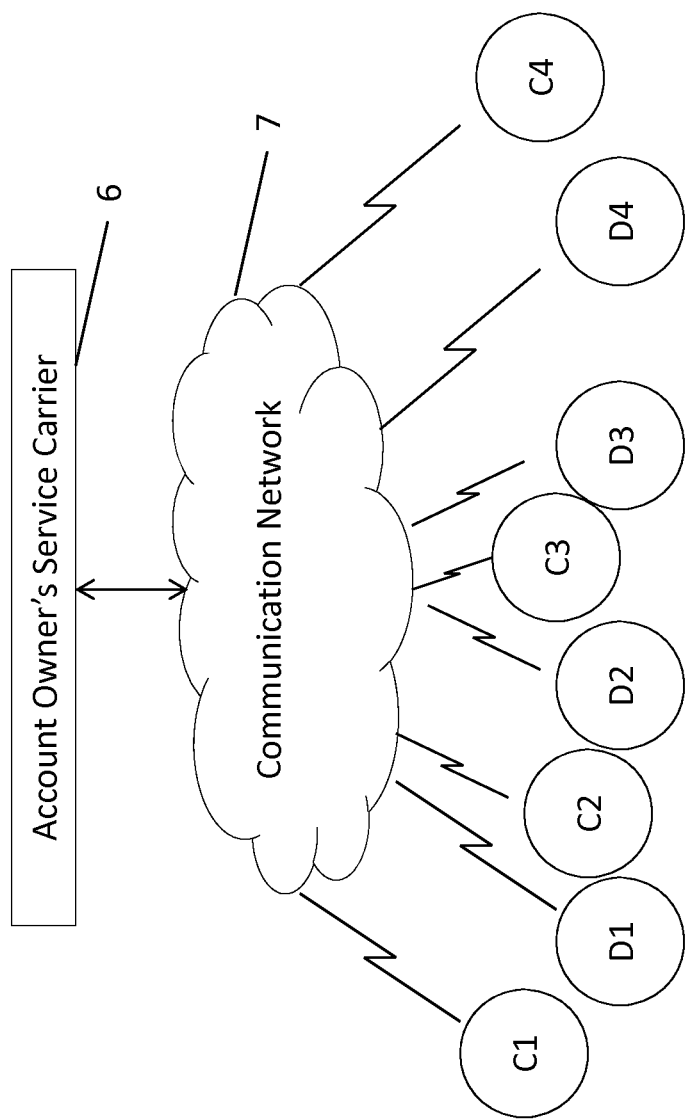
FIG. 2 is a representation of an phone service carrier's routing of a call or data request to a particular phone device.

In the non-limiting example of FIG. 5, the first cellular data service registration number R1 is associated with the first cellular data device C1, and the second cellular data service registration number R2 is associated with the second cellular data device C2. The change request is transmitted to the cellular data service number registry 58, either directly or through the account owner's service carrier 56, and the change is made. All interactions and requests coming to that cellular data access registration number are thereafter automatically routed to the new cellular data devices selected for association with the numbers and all outgoing requests made from those cellular data devices selected reflect the cellular data service registration number associated with the particular cellular data device in the user's account. If the account owner changes his or her mind, the account owner can again interact with the interface 52 and select a different physical data device C1, C2, C3, C4 to associate with each cellular data service registration number R1, R2. When data requests come in for the account owner's cellular data service registration number R1, R2, because the data device C1, C2, C3, C4 associated with the registration number R1, R2 has been changed in the service access number registry 58, or at least with the account owner's data service carrier 56, the data requests (for example like a location request or a gather data request) can immediately be routed directly to the appropriate data device C1, C2, C3, C4 through an appropriate Communications Network 7 (FIG. 2). It should be understood that the account owner's access to the account owner's interface 52 may be through one of the data devices C1, C2, C3, C4 associated with the account owner's account through a phone dial-up interface or a smart phone app, or even simply through Internet access through the phone device, or through any other Internet access device known. Although the particular example above illustrates two cellular data service registration numbers associated with the account, it is contemplated that in many, if not most, applications, an account interface may have only a single cellular data service registration number that is being switched between the various cellular data devices. This single registration number embodiment, however, is merely a simpler version of the embodiment described in relation to FIG. 5.

Several advantages are immediately realized through this approach and method of FIGS. 1, 2 and 5. First, because particular embodiments of this technology enables users to easily swap between cellular devices and to easily push cellular service to any cellular device associated with an account owner's account interface at will, account owners and other physical phone device users are no longer limited to thinking of their smart phone as their only phone. Account owners can now purchase or own many different phones and other cellular devices for different activities and purposes. Second, the cellular phone device selected does not need to be physically in the possession of the account owner when a different phone number is associated with the device through the interface. This provides particular advantage because the account owner can temporarily push cellular service out to a remote cellular phone device for, by non-limiting example, a child or other family member who needs to make a call and still recover the cellular phone usage at any time. Third, because the cellular phone device does not need to be physically present to make the phone number change or to associate the device with an active service plan, the account owner can temporarily activate any cellular phone device associated with their account at any time and track its location on a map, for example. For asset tracking, this is invaluable, and even more so to help track children and pets when lost, kidnapped or stolen. Cellular phone devices associated with the account would not need to be standard cellular phones as they are currently considered and treated, but would include any device with cellular communication or other network communication technology. For asset tracking, the system could simply use the cellular network that is so prominent and widespread throughout the world for tracking an asset's location using cellular communication tower triangulation techniques known in the art. Such tracking capability through cellular tower triangulation or even GPS in some devices is already inherent in many cellular phone devices.

It is anticipated that as a result of the presently described technology, not only will cellular phone users get longer use out of their cellular telephone devices by having use for a phone beyond its "new technology" life, but cellular telephone manufacturers will sell many more cellular phone devices because each user is no longer limited to a single cellular phone device with their phone service. Additional physical phone devices for many more limited purposes will be sold so that each end user has access to multiple cellular phone devices for each service plan. For example, watch phones, which are currently unpopular and relatively unknown among cellular phone users may become popular. Cellular devices with two or even three SIM cards are currently manufactured by Benfon of Finland and Akai of China and are expected to become more popular as users can selectively alternate which SIM card is being used for which phone number and to bring in multiple phone numbers at will to the cellular device. Cellular devices for use in asset tracking and for younger child use may also become popular. Several non-limiting examples are provided below.

In addition to the ability for the account owner to select a particular cellular phone device from a list of particular cellular phone devices to associate with a particular phone number associated with the account owner's account through the interface, the account owner may, in particular embodiments, have the option to administer additional features and limitations on calls and/or data transmitted to a particular cellular device depending upon its purpose and functionality. For example, in one particular implementation, the cellular device may not be able to accept text messages and the user could indicate that text messaging should continue to be sent to the first device. In another particular implementation, the purpose of the cellular phone may be for running and the user wants to send all calls except a limited number of phone numbers to voicemail automatically and only pass through calls from family. Alternatively, the user's control may limit which phone numbers the cellular phone can dial.

Additionally, by having the option to selectively choose which phone number a particular cellular phone device is associated with, a phone user may change phone numbers for sequential calls made through the same cellular phone device by making a first call, accessing the account owner's account, finding the particular physical phone device listed in the account owner's account, selecting a different phone number to be associated with the particular physical phone device, and submitting the change to the phone number registry. Once the change is implemented, another call from the same physical phone device through which the previous call was made using a first phone number will be made using a second, different phone number.

In another particular implementation, an account owner may select a time duration during which the phone or other service access registration number is associated with a first cellular phone device and a second time duration during which the phone or other service access registration number is associated with a second cellular phone device, etc. A parent could limit cellular phone usage of their children this way, or have a pre-arranged time during which a child's cellular phone is automatically activated and functional so that the child can call home after school or after a party to get a ride home. Alternatively, the account owner may select a first time duration during which a first phone or other service access registration number is associated with the first cellular phone device and a second time duration during which a second phone or other service access registration number is associated with the cellular phone device.

In yet another particular implementation, a cellular phone or other cellular device user may establish a system of cellular devices attached to mobile items within a predetermined geographic area boundary beyond which the owner does not want the mobile items to extend or for which items the owner wants to identify their respective locations on a periodic basis. For example, an owner of a fleet of cars may want to track the locations of those cars, a retail store may want to track the respective locations of a plurality of high end merchandise items prior to sale or the locations of its shopping carts used by customers, or a company may want to track the location of particular items or equipment. In any of these cases, each item to be tracked may be associated with a cellular tracking device, which may be implemented as a simple cellular phone device without a microphone or speakers. The account owner, or a third-party service, enters the cellular tracking device unique identification numbers into the cellular service interface. On a scheduled basis, an appropriately programmed system may automatically cycle through each of the cellular tracking devices associated with a particular account by transferring cellular service associated with the account to that particular cellular tracking device temporarily but long enough to identify the respective locations of each cellular tracking device using conventional cellular tracking methods for locating each item. The system may store their respective locations for display to a person responsible for monitoring the items being tracked, or may simply automatically identify if each of the items is within the predetermined geographic area where the items are expected to be and store the location of the item if it is not within the predetermined geographic area. The system may also be programmed to identify a different predetermined geographic area for each item being tracked. In some cases, the "item" may be a child so that the same type of system could also be used for automatically tracking children and notifying a parent if there is an anomaly in a child's location at a particular time.

Figure 6:
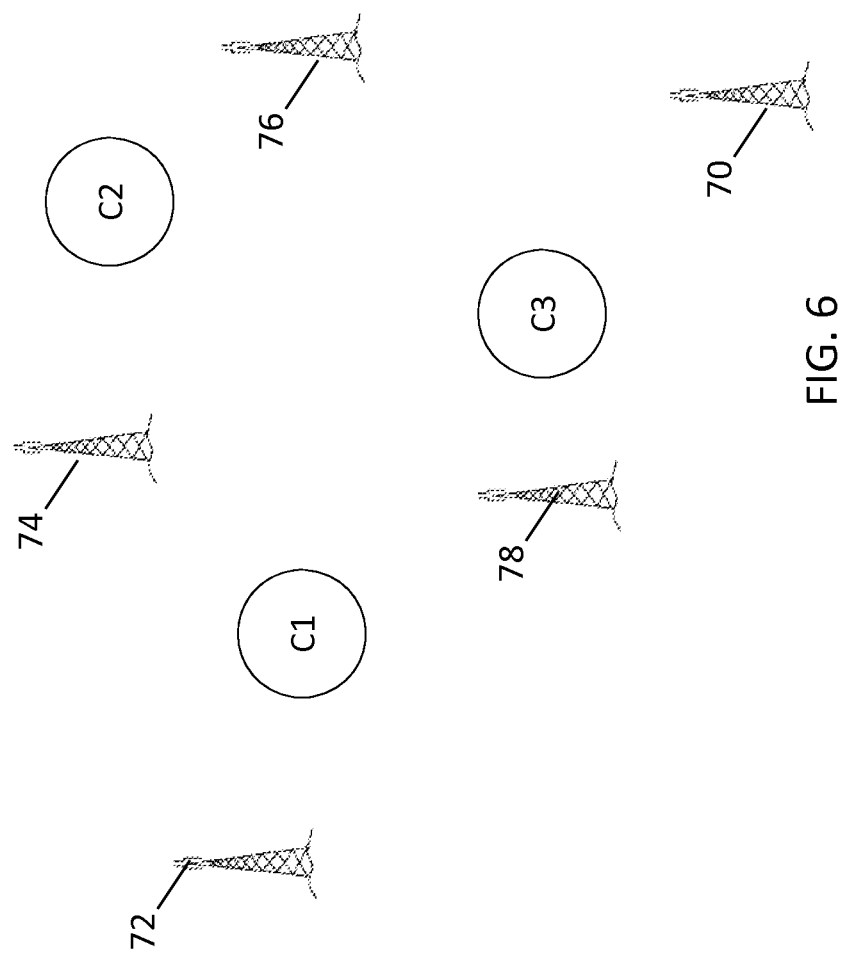
FIG. 6 is a diagram of an asset tracking system using cellular tower triangulation locating or GPS locating.

FIG. 6 illustrates a non-limiting example of a cellular locating system of a system of cellular devices using a single cellular owner account and single cellular data access registration number. In the embodiment of FIG. 6, one or more cellular devices C1, C2, C3 are illustrated remote from each other, and a plurality of cellular towers 70, 72, 74, 76, 78 in proximity to the one or more cellular devices C1, C2, C3 are shown. Alternatively, the towers could be wi-fi or other wireless communication signal towers 70, 72, 74, 76, 78 in proximity to one or more data devices C1, C2, C3. Triangulation of location using cellular towers or any other wireless communication towers is known in the art and those of ordinary skill in the art will readily understand how to accomplish triangulation for identifying a location of a cellular device C1, C2, C3 from the present disclosure. The term "tower" is used, herein, not to necessarily indicate a scale of structure or particular type of structure, but simply a signal transceiver node. U.S. Pat. No. 6,272,342 to Havinis et al. titled System and Method for Providing Historical Data for Location Services, issued on Aug. 7, 2001, and U.S. Pat. No. 6,674,403 to Gray et al. titled Position Detection and Location Tracking in a Wireless Network, issued on Jan. 6, 2004, the disclosures of which are hereby incorporated herein by reference for their relevance in explaining how the locations of cellular and other wireless communications devices may be determined using surrounding signal towers/nodes. In a particular implementation, a user, either through an automated process operably associated with an account owner's user control account or manually through the account owner's user control account, requests a location of a first cellular device C1 associated with the account owner's cellular data access registration number through the account owner's user interface. Using any of the many conventional methods known in the art for retrieving the location of the cellular device, the cellular communication network system triangulates, through the plurality of cellular towers 70, 72, 74, 76, 78 an approximate location of the cellular device C1 and reports that location to the account owner's user control account or to memory accessible by the account owner's user control account. Once a location is identified for the first cellular device, C1, either through previously configured automation or manual selection by the account owner, the system receives input from the account owner indicating which different cellular device, C2, C3, associated with the account owner's cellular data service user control account the account owner wants to obtain location information for.

The account interface processor 4, 54 (FIGS. 1, 5), automatically through a predefined, scheduled or other user-established predefined request process or manually through direct user interaction at the time of the request, indicates which of the at least two different cellular data access devices C1, C2, C3 associated with the cellular data service user control account is to be associated with the cellular data access registration number associated with the user control account. If it is different than the cellular data access device C1 then currently associated with the cellular data access registration number, the account interface processor 4, 54 dissociates the then current cellular data access device C1 by transmitting a signal (through direct or indirect paths) indicating a change to the cellular data access registration number registry and indicating that the communication network access for the then current cellular data access device C1 is to be disabled. The account interface processor 4, 54, then transmits, through similar channels, a signal indicating a change to the cellular data access registration number registry service with the account owner's new indication of which of the remaining cellular data access devices C2, C3 is to be associated with the cellular data access registration number. The indication for dissociation and new number association may be done in a single or multiple signals to one or multiple locations or processors. This process may be followed, sequentially dissociating and associating different cellular data access devices, for any number of different cellular data access devices associated with the account owner's service access user control account until an approximate location for a selected group of cellular data access devices is determined. The results can be displayed on a map or delivered to the user in a tabular or other format as particular circumstances warrant.

Alternatively, if the cellular device includes global positioning system (GPS) hardware and capabilities, the same may be accomplished using GPS technologies rather than cell tower triangulation. U.S. Pat. No. 8,244,454 to Tertoolen titled Navigation Device and Method, issued on Aug. 14, 2012, the disclosure of which is hereby incorporated herein by reference for its relevance in explaining how to determine a location of a device using GPS technologies which may be incorporated into any of the phone or data devices disclosed herein.

Figure 7:
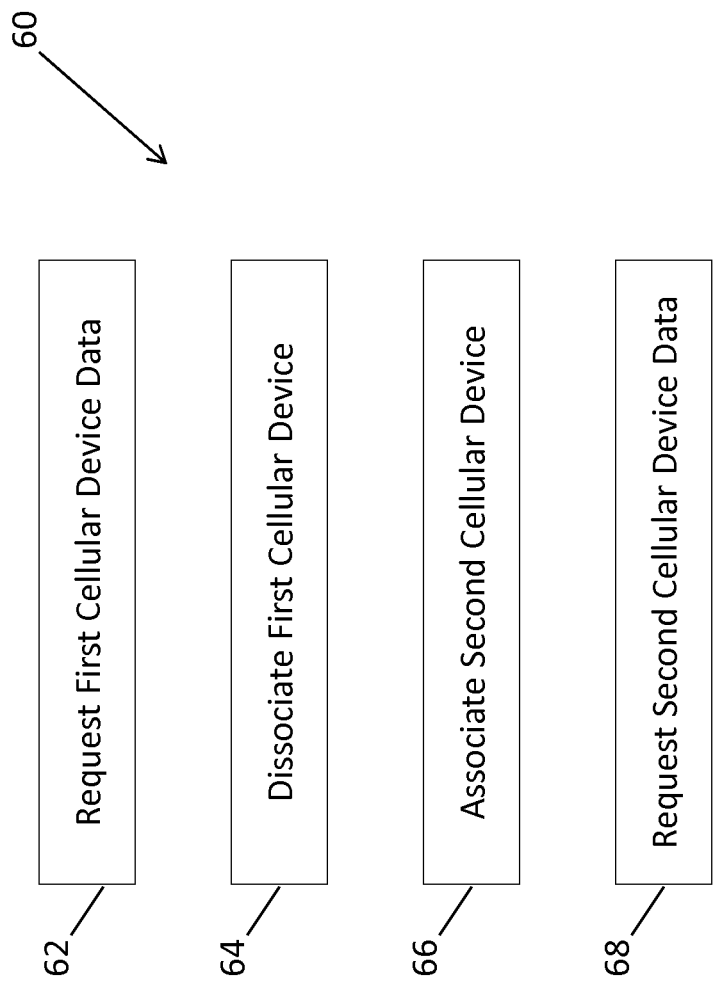
FIG. 7 is a flow chart for a automated data gathering system from a plurality of cellular device nodes each using the same cellular phone plan or cellular data plan.

FIG. 7 illustrates a non-limiting method 60 example of how location or other data may be gathered about, from or through a plurality of remotely located cellular devices using a single cellular owner account and single cellular data access registration number. A plurality of remote cellular devices of any type, for example cellular telephones, cellular chips, tracking tags, data processors associated with a cellular data network access processor, or any other cellular device now known or to be devised, may be associated with a cellular data service user control account or any other cellular service user control account having hardware and/or software that provisions the device to communicate with a communication network, by entering a unique identifier for the device hardware into association with a user control account. The user control account has associated with it a service access registration number associated with its account with a data service provider that permits authorized devices to access data through the data service provider's communication network. In the case of a cellular phone, the service access registration number may comprise a phone number. In the case of a data only device, the service access registration number may comprise a unique identifier or code that can be passed to the communication network to indicate that the device is authorized to access the data communication network, such as the data portion of a cellular telephone network.

In the specific example of FIG. 7, a first cellular device is associated with a cellular data communication network and authorized to access the network by comparison of the service access registration number with a data service carrier's cellular data access registration number registry. A computer system remote from the first cellular device, which may be incorporated into the system managing the cellular data service user control account or some other separate system, contacts the first cellular device and requests data of the first cellular device (Step 62). The cellular device data requested may relate specifically to an aspect of the first cellular device itself, such as its location or a status of the device. Alternatively, the data requested may relate to data collected and transmitted through the cellular device, such as environmental data collected by separate equipment near the cellular device or financial or other data stored near the cellular device for transmission to a central computer. Any data which may be transmitted electronically over a cellular phone or cellular data or other communication network may be transmitted and this disclosure is not intended to limit the type or quantity of data transmitted through this description and certainly any data mentioned herein and more is contemplated for transmission using this method. Processors associated with the cellular device may, in some implementations, use the cellular data access service to access a network or Internet web site and upload data directly to that web site through an Internet connection accessed through the cellular device rather than transmitting the data to a processor directly associated with the user control account. Once the cellular device is contacted, the data requested and data is delivered to its intended destination, a processor associated with the user control account may automatically, as discussed elsewhere herein, or manually by direct user action, transmit information to the cellular service provider or cellular data access registration number registry indicating the user's intent to dissociate the first cellular device with the carrier's cellular data access service or cellular data access registration number registry, indicate a second cellular device with which to associate with the cellular data access service, and associate that second cellular device with the cellular data access service (Step 66) as described elsewhere herein. Once associated, data may then be requested (Step 68) through a communication channel established between the second cellular device and the cellular service provider's cellular communication network. This pattern may be followed multiple times to request data from any number of cellular devices at remote locations.

Interfacing with a cellular data service user control account may be accomplished in the same ways described as for a cellular phone user control account. In one particular implementation, a user may access the cellular data service user control account through an application on the user's smart phone, the user indicating that a data plan, or a phone plan or both be swapped from the smart phone to another device, or from a third cellular data device, such as a computer tablet, navigation system or pet tracking tag to another cellular data device. There is no requirement that the device be in the user's possession at the time of changing its association or activation or at dissociation or deactivation with the communication network. Many devices, particularly at home, have wi-fi Internet access and that communication connection may just as easily be used to communicate with a cellular service provider's communication network to identify which cellular device the user wants the user's cellular service associated with and to associate that service with a particular device.

Additionally, for tracking items or for monitoring locations of a user's children, in addition to or as an alternative to automatically cycling through a number of items being tracked to identify their respective locations for display, a system may be programmed to permit an account owner to select a particular cellular device from a list of cellular devices associated with the account owner's account and select the particular cellular device from the list for which the account owner desires to identify the location. This is particularly useful in situations where a parent wants to identify the location of a child on an instant ("just checking") or ongoing ("my child is missing and I need to constantly track location data") basis. It is specifically contemplated that in particular embodiments a user may have separate phone and data service registration numbers associated with the user's online device swapping interface to enable the user to swap one service, for example the data service, to a tracking device on the child's person and maintain the second service, for example the phone service, on the user's smart phone to track the child's location while monitoring that location through a map viewable on the user's smart phone.

As mentioned previously, a phone swapping account may be associated with one or more phone or other registration numbers and one or more phone or other data devices, though in most cases it will be two or more devices. The account owner can, on its own without any assistance from a customer service representative, choose which phone number or other registration number is associated with which phone or data device and make the change through a simple interface regardless of whether the account owner has immediate physical access to any of the physical phone or data devices. Changing the association of a particular registration number with a particular physical phone device can be done in a number of different ways. In one embodiment, an account owner, through a system interface such as an Internet account connection, a mobile phone application or pressing a predetermined sequence of buttons on a mobile phone device in communication with a changing system, may simply select a particular mobile phone device previously associated with the account owner's account for activation from a plurality of mobile phone devices on a list. Swapping back to the primary phone device for service can also be done in the same ways or even as simply as pressing a button or series of buttons on the phone device that resets the service to a default primary phone device.

Mobile phone applications and phone device internal hardware can vary widely and may be used to implement a device swapping operation as simple as tapping two phone devices together in a particular manner to initiate a function to indicate a user's preference to have service transferred from one device to the next, provided both are registered with the user's interface. Mobile phone applications may be Internet based or non-Internet based, may interact directly with a service carrier's servers or through a third party's servers. In another particular implementation, the user may carry an electronic identifier that identifies the user to whichever registered device the user is closest to so that the user's cellular service automatically transfers to that device when the user is near that device if the user has set up the user's preferences to indicate such a swap is desirable. In yet another particular implementation, a phone device may be configured such that a particular shaking action by the user of the phone device, or a pattern of shaking causes hardware and software within the phone device initiates an indication of the user's desire to pull phone or data service to that particular phone device. In still other embodiments, the user may be provided with a programmable interface with a series of buttons, each indicating a particular device. When a user presses one of the buttons, phone or data service is transferred to the device programmably associated with that button from another device. In still yet another embodiment, a particular voice command into the user's phone device by the user (whether it is processed by the phone or by a service carrier's remote processor) may be configured to pull phone or data service to the device, indicating the user's preference to have service at that phone device.

In another embodiment, the user may predetermine a particular time at which the system automatically changes a phone or data service from a first mobile phone device associated with the account to a second mobile phone device associated with the account. The account owner may also establish a predetermined duration for the change to last and either automatically change back to the first mobile phone device or to a third mobile phone device. In yet another embodiment, the account owner may predetermine a particular time at which the system automatically cycles between all or a selected some of the mobile phone devices on the list for selected durations on each for the purpose of determining the respective locations of the mobile phone devices. In still yet another embodiment, an end user of a first mobile phone device may have a predetermined set of buttons on the mobile phone device, even, by non-limiting example, a phone number and entry code, that the end user can press to capture the service associated with a phone carrier service account and be able to pull the service from whatever device it was previously associated with and associate it with the first mobile phone device.

The following are particular implementations and embodiments of methods and systems for implementing various aspects of an account owner controlled temporary cellular service device swapping system, provided as non-limiting examples:

EXAMPLE 1

Rugged, waterproof sports watch phone. If an account owner is going running, swimming, to the beach, out to play baseball or some other sport, the account owner simply logs in to their interface through a computer access to the Internet, selects the sports watch phone as the cellular device to activate from among a list of many different possible cellular devices accessible by the account owner, and submits the change. The account owner can then take the sports watch phone and use that phone rather than an expensive smart phone. Generally when the account owner is participating in sports, the account owner does not need all of the functionality of a smart phone and would prefer a simpler, more rugged and even water-proof phone option. Particularly for waterproof watch phones, there is not simply a SIM chip that even could be swapped out to change an account to the device and so such a device is generally assigned its own phone number.

EXAMPLE 2

Asset tracking unit. For some asset tracking uses, full mobile phone functionality is not needed, such as voice and data streaming, and location data is all that is needed. For such cases, a cellular chip and power supply is only needed without the speaker, microphone and input buttons that generally take up so much space in a conventional mobile phone. Such asset tracking unit may be encased in a simple packaging depending upon the intended use. If being mounted to a larger structure, for example, it may include a mounting bracket integral to the housing. If intended for use as a clip-on device, a clip may be alternatively used.

EXAMPLE 3

Press and capture device. For some devices or accounts, it may be desirable to allow someone in physical possession of a particular phone device associated with a phone swapping account to capture cellular service to the device even when the account owner has not transferred cellular service to that particular device from remote location. In such cases, an account owner may pre-associate an account, a particular phone number (or any available phone number associated with the account), and a button sequence (could be a single "emergency" button on the device or a sequence, such as a numeric sequence, of buttons) or option on a phone application with a particular device so that when a person in physical possession of the mobile phone device presses the button sequence or selects the phone application option then the online access phone network system automatically changes the account settings so that the account reflects that that particular phone device is associated with that particular phone number. Such button sequence or phone application option may comprise the physical phone user to dialing a phone number and pressing a particular sequence to initiate the change in the account settings. In this way, a parent or other account owner can pre-set a phone to be able to pull cellular service to that device on demand when needed, but only when needed. Non-limiting examples of use would include a parent delivering an emergency phone to a child that only works when needed, or an account owner who wants a particular phone to only work when the physical phone holder temporarily activates the service. That service may then be automatically transferred back to where it came from after a predetermined time or only when moved back by an account owner or another cellular device pre-set to be able to pull cellular service to that other cellular device.

EXAMPLE 4

Walkie-Talkie device. Similar to Example 3, for some devices or accounts, it may be desirable to allow two people in physical possession of two separate particular phone devices associated with a phone swapping account to each, in turn capture carrier voice services to the device by pressing a single button on the device. An account owner may configure a particular account so that two or more particular mobile phone devices associated with the account can each capture the carrier voice service associated with a particular phone number. In such cases, the system may be programmed to transfer the service back and forth between the two or more separate particular phone devices in a predictable manner to allow for a simple discussion between the two or more devices. Particular uses may include, for example, a discussion between a young child and its parent or between siblings.

EXAMPLE 5

Automatic proximity swapping devices. Although swapping mobile phone devices may be accomplished for a particular account by simple selection through an Internet interface or selecting a different mobile phone device from a phone application on a smart phone, some physical phone users may desire that when the user is in particular locations or in proximity to a higher priority mobile phone device, that the system automatically alters the account settings so that the user's active phone device is a different device. For example, a physical phone user may want the phone service to automatically switch to a home phone system when the user arrives home or to an office desk-top service when the user arrives at the office. By establishing a hierarchy of priority phone devices through the account interface, an account owner can choose which phone device takes control based on the physical phone user's location or based on the physical phone user's proximity to a higher priority device. Communication between the different devices associated with an account may be through cellular phone location settings, or through proximity communication through wireless communication between the devices themselves.

EXAMPLE 6

The system may be programmed by those of ordinary skill in the art to be smart enough to identify which mobile phone device is moving, and automatically switch to the device which is moving if the account owner selects this option. This option may be combined with a pre-proximity confirmation and/or an ongoing movement confirmation to confirm the moving phone device is actually the intended device. This allows the physical phone user to automatically switch to the exercise phone, for example, without the account owner personally changing any settings when the physical device user picks up the exercise phone to go exercising.

EXAMPLE 7

Automatic time limits devices. In some situations, an account owner may desire for a particular phone device to have active access to a phone and/or data service for limited times or durations. For example, a teenager with a phone curfew or restricted use during school. The system may be programmed to schedule times when the phone and/or data service is automatically disassociated from the particular phone device and associated with another. The account owner may choose the particular device, phone number, times, dates, and/or ranges through the account owner's interface to the account. This is also useful for two people who are sharing a phone and/or data service but each wants to have his or her own mobile phone device.

EXAMPLE 8

Child and other asset monitor. The system may be programmed to have account owner options that allow the account owner to choose particular cellular devices that are monitored for location. Whether it is only a single phone device or multiple phone devices, the system may be programmed to temporarily transfer cellular service associated with one or more phone numbers or registration numbers associated with the account to a particular cellular device through the account long enough to monitor the location of the particular cellular device and then dissociate the particular cellular device with the service. The location may be reported immediately to the account owner or another designee, or may be reported only if the device is not in an expected location or range. The account owner may also be able to establish as a limit a particular geographic range (i.e. ½ mile radius) around another cellular device, or address for which the system can track and report.

EXAMPLE 9

Video conferencing system. Many users desire the ability to more easily video conference and the needed technology is available. It is just not convenient for incorporation into most users' smart phones. Once the ability for users to associate multiple phone devices with their phone or data service becomes readily available, use of video conferencing devices will also become more readily available. The system may be programmed to enable the account owner to associate a video conferencing system unique identification number with the account so that a user can select the video conferencing system to associate with the phone or data service. There are many devices now available that have larger screens and video conferencing capability, but do not yet have convenient phone or data service access without an exclusive phone or data service associated with the video conferencing.

EXAMPLE 10

Conference phone system. Many users desire the ability to have more robust phone conferencing associated with their cellular phones, and the ability to have better acoustics associated with the system than most cellular phones provide. There are many reliable, robust and great sounding conferencing systems available, but they are generally too large for incorporation into most users' smart phones. Once the ability for users to associate multiple phone devices with their phone or data service becomes readily available, the use of a better phone conferencing system with an account owner's phone system may also become more practical. The system may be programmed to enable the account owner to associate an audio conferencing system unique identification number with the account so that a user can select the audio conferencing system to associate with the phone or data service. In particular instances, multiple users' accounts may simultaneously be associated with a single conference phone system to enable additional phone lines to be used for a particular conference call.

EXAMPLE 11

Public system. Public or semi-private phone devices may be made available with additional functionality beyond standard functionality of some phones to enable a phone user to select a public or semi-private phone device and its functionality to which the phone user has access, and allow the phone user to temporarily transfer the phone user's phone or data service to that phone device. For security, the temporary transfer may also require proximity to the alternate phone device and specific permission granted through pressing a security code followed by dissociation when proximity is no longer present (proximity sensing through wireless communication methods is known in the art in many different forms). This may allow a user to access for free or even pay a fee for use of a public or semi-private phone device with additional functionality without the need to sign up for a separate phone or data service or to have it charged to the user's existing phone service, and use the user's same phone number that all of their contacts are familiar seeing. An example of a semi-private phone device may include an employer's phone device (like an office phone device, video phone device, conference phone device, or even personal cellular phone device) or a phone device within a private establishment like a restaurant or video conferencing bar.

EXAMPLE 12

Pet Phone Unit. Many pet owners worry about their pets' location and well-being. A simplified phone device may be manufactured with no buttons, but simply a speaker and a microphone and a cellular chip to allow the pet's location to be tracked, as with previous examples, but also to allow the pet owner to speak to the pet and hear a response. The pet owner can be notified when the pet is outside of a predetermined geographic range, and an automatic message may be played to the pet or the owner may connect directly to the device to instruct the pet to go home. This type of unit may also be used for children.

EXAMPLE 13

Employer Unit. A company could purchase and issue standard company cellular devices to its employees that each include multiple SIM cards or cellular chips in them and have an employee's business number assigned to one SIM card or cellular chip. The employee could then assign the employee's personal phone number to the other SIM card or cellular chip through the cellular phone device swap system and only carry one cellular phone device (rather than the two cellular phone devices that many who have a business phone number and a personal phone number currently carry). When the cellular phone device needs to be assigned to a different employee, the employer can very simply reassign the second SIM card or cellular chip to a different employee personal phone number through the online cellular phone device swap network with or without access to the specific device.

EXAMPLE 14

Additional mobile device examples. By non-limiting example, here are some examples of mobile devices which may become more popular with the existence of the presently disclosed technology and which may be incorporated into the presently disclosed system by associating a unique identification number with the specific devices for association with the owner's account: watch phone, home phone system with base unit and multiple devices in separate rooms connected to the base unit, video conferencing system, desktop hand-held unit, text-only unit, pet tag for locating pet, key chain cellular device for tracking, disguised cellular device to include in an unnoticed place (such as in the trunk or on a dash board of a car, or built in to a car, or backpack clip or article of clothing, or toy, or television remote, or the like, for tracking an important item, for a walkie-talkie-like device where with one service plan two people can carry on a simple conversation with only one speaking at a time in succession, as a necklace for use by elderly or a child for tracking the person or as an emergency device where the elderly or child can call for help or call to their caregiver easily by pulling phone or data service to the device only when needed, a television remote control or even a television configured as a mobile phone device to which phone or data service can be pushed, a personal computer or laptop configured as a mobile phone device to which phone or data service can be pushed, a water bottle, sunglasses, article of clothing, hat, ring, shoe, "smart home" system, pet collar, toy, decorative ornament, automobile computer system or any other article may be configured to include a cellular or other mobile phone chip with a unique identifier to which phone or data service can be pushed through an online interface on a temporary, account owner controlled basis.

Those of ordinary skill in the art of mobile phone technologies understand how to remotely and indirectly charge mobile phone and data devices by methods known in the art such as charge plates, remote power transfer charging, electromagnetic wave transmission charging, charging by simple movement of the mobile phone device itself, plugs, batteries and the like. The specific method of charging the devices themselves is not critical to the present disclosure.

Additionally, from the principles and concepts disclosed herein, those of ordinary skill in the art will readily understand that account owners will have many more uses for mobile phone devices beyond the previously commonly used ones and that each particular use of a mobile phone device will require a different set of components and functionality for the mobile phone device. The level of mobility of each phone device that can be associated with an account and selected by an account owner may vary significantly and some may not be very mobile at all except that wherever they are placed the phone system can recognize the specific device and transfer phone or data service from the carrier to it. The key to the benefits described herein is the account owner's ability to view a plurality of physical phone devices associated with the account owner's account and to selectively transfer phone or data service to any of the phone devices associated with the account by selecting it from the list and submitting a change of service to another device.

The following are non-limiting explanations of how an account owner's interface with an account may work. The non-limiting examples include how security of phone numbers and cellular phone devices may be verified through the interface.

When an account owner initially creates an account, the account owner enters account information and sets up an account specific to the account owner, likely including an email address, billing address, personal contact information and the like. The account owner identifies one or more phone or other registration numbers that are each associated with phone or data service through one or more mobile phone service carriers to the account for verification. Verification that the account owner controls that phone number and is authorized to control that phone number may be accomplished in any of many ways known in the art such as, without limitation, comparison with the phone number account records stored at the service carrier and verification through the phone by a verification system calling the phone number identified and requesting the physical phone user to enter a security code. If the security code is entered correctly, the phone is verified. The security code may be provided to the account owner during registration of the number or may be a number found on the physical phone itself, such as a physical device unique identification code.

Once a phone number is verified, or simultaneously with verifying the phone number, the account owner may be prompted to enter unique device identification numbers to verify mobile phone devices to associate with the account.

There may be two classifications of mobile phone devices for association with the owner's account: New device to verify, and previously verified device. For a previously verified device, the account owner may be prompted to enter a registration number from the device into the interface which is programmed to look up the specific device identification number from a database associated with the registration number. For a new device to verify, the account owner may be prompted to retrieve the specific device identification number from the phone device itself and enter it into the system which then assigns a registration number for the phone device. Verification of the device may occur immediately using a system phone number, or the first time the account owner elects to transfer phone service to the device with an account owner's phone number. When the device is associated with a particular phone number and the account owner instructs the system to transfer service to that particular device, the system transfers information representing the device unique identification number and the phone number with which the device is to be associated with to a phone number registry or company which interfaces with the phone number registry, such as a phone service carrier, to implement the change. Once the change is made, the system verifies that the device is in the control of the account owner, in any of the known ways for verifying including those discussed previously herein. Thereafter, if an account owner desires to temporarily transfer phone service to the phone device, the owner can do that using any of the methods described throughout this disclosure. Other known methods may be used to verify phone or other registration numbers.

Because an account owner can transfer phone or data service away from any device associated with the owner's account, the presently disclosed technology may also help with reducing phone theft. Particular embodiments of the present system restrict a physical phone device from being verified with more than one owner account at a time. If a phone is stolen, but has previously been verified with a particular owner account, the account owner may discontinue phone or data service for that physical phone device immediately and may even report the phone stolen, and the thief may be prevented from registering the physical phone device with another account. Nevertheless, the account owner can selectively provide phone or data service to the phone device to track its location for the authorities to track down the thief.

Through the account owner's interface, the account owner can choose for each phone device associated with the account owner's account which phone number associated with the account owner's account is associated with the phone device. In some embodiments, this includes limitations in the account so that only a single device associated with each phone number. In other embodiments, this permits an account owner to assign primary and secondary phone numbers to each of many devices and preferences for temporarily swapping phone and/or data service between the devices.

As used herein, the terms "component," "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary," "example" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated that a myriad of additional or alternate examples of varying scope could have been presented, but have been omitted for purposes of brevity.

Furthermore, all or portions of the subject innovation may be implemented as a method, apparatus or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 3:
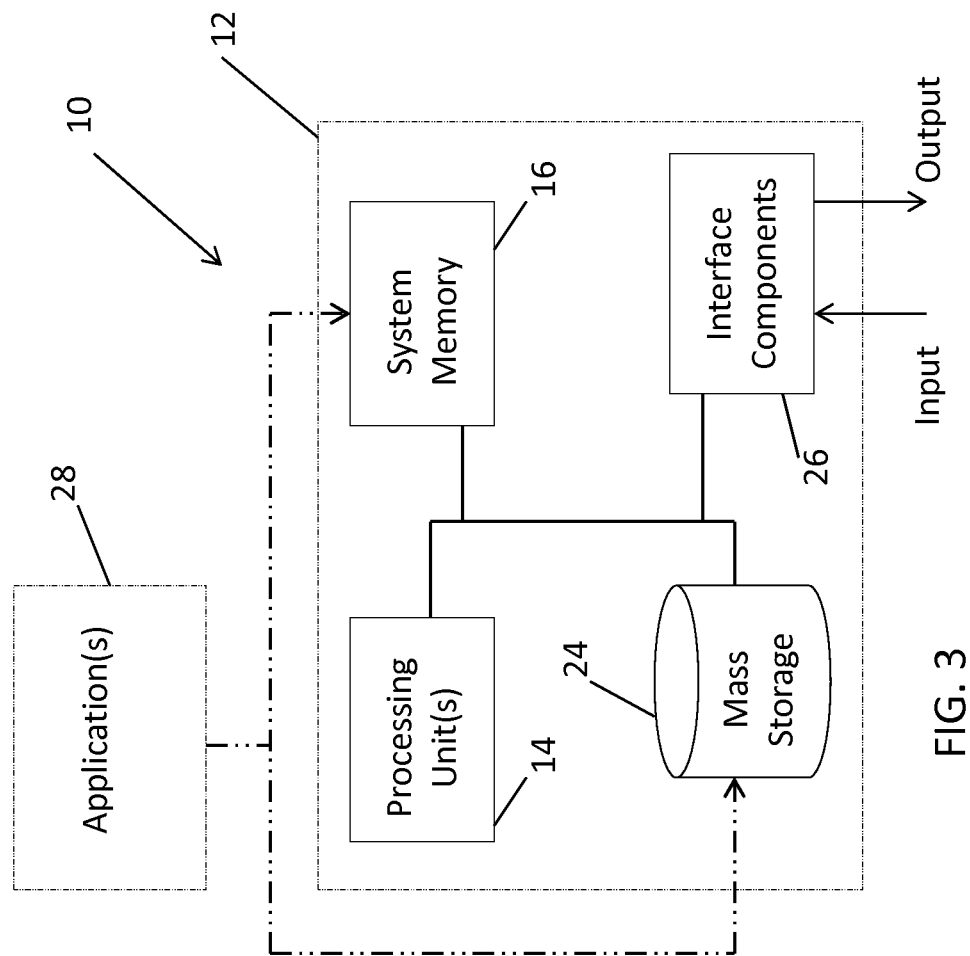
FIG. 3 is a schematic block diagram illustrating a suitable operating environment for aspects of the disclosure.

In order to provide a context for the various aspects of the disclosed subject matter, FIGS. 2 and 3 as well as the following discussion are intended to provide a brief, general description of a suitable environment in which the various aspects of the disclosed subject matter may be implemented. While the subject matter has been described above in the general context of computer-executable instructions of a program that runs on one or more computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the systems/methods may be practiced with other computer system configurations, including single-processor, multiprocessor or multi-core processor computer systems, mini-computing devices, mainframe computers, as well as personal computers, handheld computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed subject matter can be practiced on stand-alone computers. In a distributed computing environment, program modules may be located in both local and remote memory storage devices.

With reference to FIG. 3, an exemplary environment 10 for implementing various aspects disclosed herein includes a computer 12 (e.g., desktop, laptop, server, hand held processing device, cellular phone device, programmable consumer or industrial electronics, and the like). The computer 12 includes a processing unit 14, a system memory 16, and a system bus. The system bus couples system components including, but not limited to, the system memory 16 to the processing unit 14. The processing unit 14 can be any of various available microprocessors. It is to be appreciated that dual microprocessors, multi-core and other multiprocessor architectures can be employed as the processing unit 14.

The system memory 16 includes volatile and nonvolatile memory. The basic input/output system (BIOS), containing the basic routines to transfer information between elements within the computer 12, such as during start-up, is stored in nonvolatile memory. By way of illustration, and not limitation, nonvolatile memory can include read only memory (ROM) in some cases. Volatile memory includes random access memory (RAM), which can act as external cache memory to facilitate processing.

Computer 12 may also include removable/non-removable, volatile/non-volatile computer storage media. FIG. 3 illustrates, for example, mass storage 24. Mass storage 24 includes, but is not limited to, devices like a magnetic or optical disk drive, floppy disk drive, flash memory, Internet cloud memory, or memory stick. In addition, mass storage 24 can include storage media separately or in combination with other storage media.

FIG. 3 provides software application(s) 28 that act as an intermediary between users and/or other computers and the basic computer resources described in suitable operating environment 10. Such software application(s) 28 include one or both of system and application software. System software can include an operating system, which can be stored on mass storage 24, that acts to control and allocate resources of the computer system 12. Application software takes advantage of the management of resources by system software through program modules and data stored on either or both of system memory 16 and mass storage 24. Database data may be stored in system memory 16, mass storage 24, or some other storage associated with the computer 12.

The computer 12 also includes one or more interface components 26 that are communicatively coupled to the bus 18 and facilitate interaction with the computer 12. By way of example, the interface component 26 can be a port (e.g., serial, parallel, PCMCIA, USB, FireWire, and the like) or an interface card (e.g., sound, video, network, and the like) or the like. The interface component 26 can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computer and the like. Output can also be supplied by the computer 12 to output device(s) via interface component 26. Output devices can include displays (e.g., CRT, LCD, plasma, projection, and the like), speakers, printers and other computers, among other things.

Figure 4:
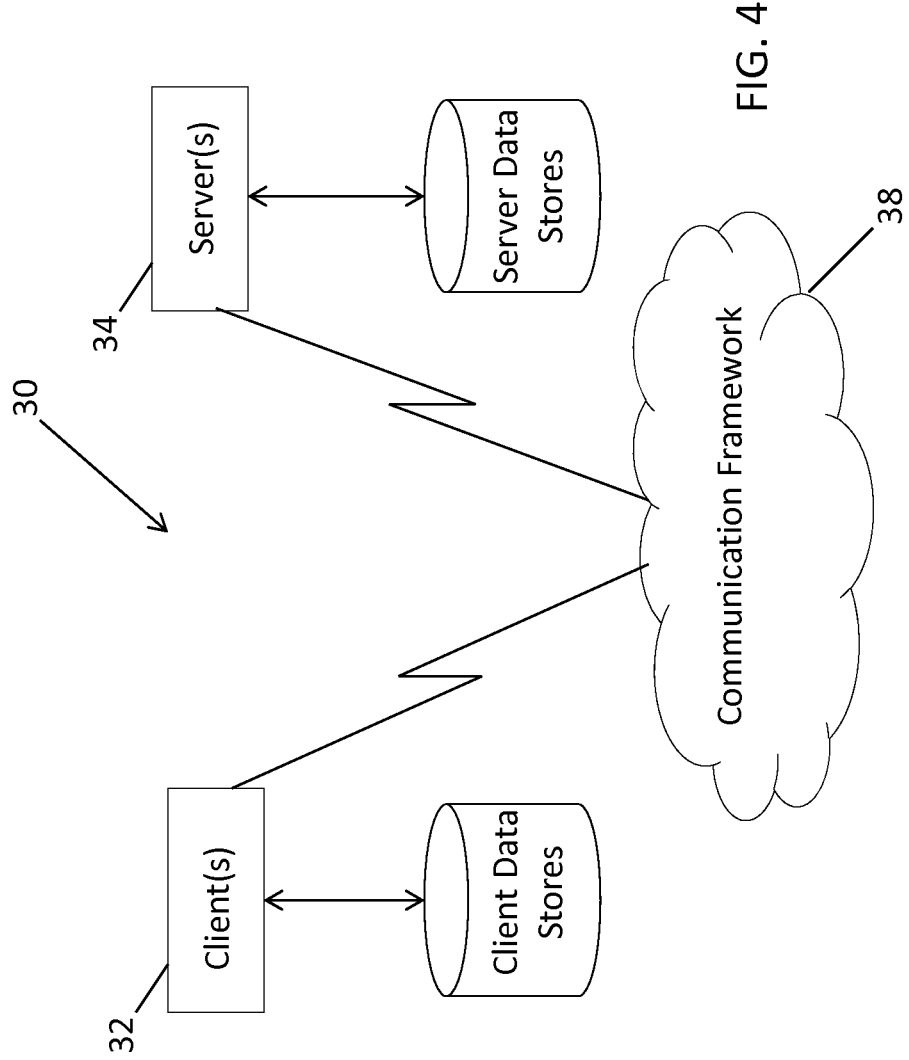
FIG. 4 is a schematic block diagram of a sample computing environment.

FIG. 4 is a schematic block diagram of a sample-computing environment 30 with which the subject innovation can interact. The system 30 includes one or more client(s) 32, for example associated with an account owner's account or a phone service carrier, or a phone number or registration number registry. The client(s) 32 can be hardware and/or software (e.g., threads, processes, computing devices). The system 30 also includes one or more server(s) 34. Thus, system 30 can correspond to a two-tier client server model or a multi-tier model (e.g., client, middle tier server, data server), amongst other models. The server(s) 34 can also be hardware and/or software (e.g., threads, processes, computing devices). The servers 34 can house threads to perform transformations by employing the aspects of the subject innovation, for example. One possible communication between a client 32 and a server 34 may be in the form of a data packet transmitted between two or more computer processes while transmitting data from an account interface displaying on an account owner's computing device and an interface processor, or between an interface processor and an account owner's phone and/or data service carrier or a phone number and/or registration number registry, or between a phone and/or data service carrier and a phone number and/or registration number registry. A communication framework 38 exists between the one or more client (s) 32 and the one or more server(s) to facilitate meaningful data transfer and communication.

Where the above examples, embodiments and implementations reference cellular phones, cellular phone networks and other cellular phone examples, it should be understood by those of ordinary skill in the art that other phone types, networks, any other telephony devices and examples could be intermixed or substituted with those provided. For example, voice over IP (VoIP), terrestrial phone lines and other phone systems known and used in the United States and other countries throughout the world with their corresponding phone number registries may be incorporated into the base cellular phone network system or implemented separately based on the concepts, principles and methods disclosed herein for enabling end telephone user controlled temporary phone and/or data service device swapping and related methods. In places where the description above refers to particular implementations of phone systems and techniques for securely permitting an end user to control which temporary phone or other device is associated with the end user's phone service, it should be readily apparent that a number of modifications may be made without departing from the spirit thereof and that these implementations may be applied to other to phone system technologies as well. For example, implementation of the disclosure is not limited just to traditional phone or mobile phone technologies and may be applied to other mobile communication devices. In particular implementations, the system may not be embodied as a phone or mobile phone system at all, but may more generically apply simply to a communications system wherein particular communications devices are assigned communication registration numbers, similar to a phone number registry but not necessarily through conventional phone technology, each communication device comprising a unique identification number like with a mobile phone device. Routing of communication connections between various communications devices may be done similar to the examples provided above relating to a phone service network. Accordingly, the disclosed subject matter is intended to embrace all such alterations, modifications and variations that fall within the spirit and scope of the appended claims. Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

The invention claimed is:

1. A method of swapping a user controlled temporary cellular service between a plurality of cellular location tracking devices, the method comprising:
registering each of a plurality of cellular location tracking devices with a user control account;
associating, through a cellular service provider's cellular access registration number registry, a cellular access registration number and its attendant cellular service with a first cellular location tracking device of the plurality of cellular location tracking devices;
receiving from the first cellular location tracking device and through the attendant cellular service data about a location of or environment near the first cellular location tracking device;
displaying the location of the first cellular location tracking device on a map;
dissociating the cellular service from its association with the first cellular location tracking device;
associating, through the cellular access registration number registry, the cellular access registration number and the attendant cellular service with a second cellular location tracking device remote from the first cellular location tracking device after the first cellular location tracking device is dissociated from the cellular service;
receiving from the second cellular location tracking device and through the attendant cellular service data about a location of or environment near the second cellular location tracking device; and
displaying the location of the second cellular location tracking device on the map while displaying the location of the first cellular location tracking device on the map.

2. The method of claim 1, further comprising temporarily associating each of the plurality of cellular location tracking devices, one at a time, with the cellular access registration number through the cellular access registration number registry, receiving from each of the plurality of cellular location tracking devices data about a location of or an environment near each of the plurality of cellular location tracking devices when the cellular access registration number is associated with a respective one of the plurality of cellular location tracking devices, and subsequently dissociating the cellular service from its association with the one of the plurality of cellular location tracking devices before associating with a next cellular location tracking device.

3. The method of claim 2, wherein associating each of the plurality of cellular location tracking devices for receiving data from each of the plurality of cellular location tracking devices is done automatically on a scheduled basis.

4. The method of claim 1, wherein associating the first cellular location tracking device for receiving data from the first cellular location tracking device is done automatically on a scheduled basis.

5. The method of claim 1, further comprising storing the data about the location of or environment near both the first cellular location tracking device and the second cellular location tracking device.

6. The method of claim 1, further comprising notifying a user of the user control account if the data regarding the location of or the environment near the first or second cellular location tracking devices is outside of pre-established data boundaries.

7. The method of claim 1, further comprising receiving input from a user of the user control account to initiate the association of the second cellular location tracking device with the cellular service when the association is requested.

8. The method of claim 7, wherein each of the first cellular location tracking device and the second cellular location tracking device are remote from the user of the user control account.

9. The method of claim 1, wherein the receiving from the first cellular location tracking device comprises receiving data about both the location of and the environment near the first cellular location tracking device.

10. A method of swapping a user controlled temporary cellular service between a plurality of cellular data gathering devices, the method comprising:

registering each of a plurality of data gathering devices with a user control account;

associating, through a cellular service provider's cellular access registration number registry, a cellular access registration number and its attendant cellular service with a first data gathering device of the plurality of data gathering devices;

receiving from the first data gathering device and through the attendant cellular service data about an environment near the first data gathering device;

displaying the data gathered about the environment near the first data gathering device on a computer display;

dissociating the cellular service from its association with the first data gathering device;

associating, through the cellular access registration number registry, the cellular access registration number and the attendant cellular service with a second data gathering device remote from the first data gathering device after the first data gathering device is dissociated from the cellular access registration number;

receiving from the second data gathering device and through the attendant cellular service data about an environment near the second data gathering device; and displaying the data gathered about the environment near the second data gathering device on the computer display while displaying the data gathered from the first data gathering device.

11. The method of claim 10, further comprising temporarily associating each of the plurality of data gathering devices, one at a time, with the cellular access registration number through the cellular access registration number registry, receiving from each of the plurality of data gathering devices data about an environment near each of the plurality of data gathering devices when the cellular access registration number is associated with a respective one of the plurality of data gathering devices, and subsequently dissociating the cellular service from its association with the one of the plurality of data gathering devices before associating with a next data gathering device.

12. The method of claim 11, wherein associating each of the plurality of data gathering devices for receiving data from each of the plurality of data gathering devices is done automatically on a scheduled basis.

13. The method of claim 10, wherein associating the first data gathering device for receiving data from the first data gathering device is done automatically on a scheduled basis.

14. The method of claim 10, further comprising storing the data about the environment near both the first data gathering device and the second data gathering device.

15. The method of claim 10, further comprising notifying a user of the user control account if the data regarding the environment near the first or second data gathering devices is outside of pre-established data boundaries.

16. The method of claim 10, further comprising receiving input from a user of the user control account to initiate the association of the second data gathering device with the cellular service when the association is requested by the user.

17. The method of claim 16, wherein each of the first data gathering device and the second data gathering device are remote from the user of the user control account.

18. The method of claim 10, wherein the receiving from the first data gathering device further comprises receiving data about a location of the first data gathering device and displaying the location on a map.

19. The method of claim 18, wherein displaying the location of the first data gathering device on a map is done while displaying a location about the second data gathering device on the map.

20. A temporary cellular network based asset tracking system comprising:

a plurality of cellular location tracking devices each located remotely from each other and each registered with a user control account, accessible through the Internet;

a cellular access registration number and its attendant cellular service actively associated with only one of the plurality of cellular location tracking devices at a time; and a user control account interface configured to allow a user to temporarily associate the cellular access registration number and its attendant cellular service to each of the plurality of cellular location tracking devices one at a time and receive from each of the plurality of cellular location tracking devices data about a location of or an environment near the respective cellular location tracking device when the cellular service is associated with the respective cellular location tracking device and display the location of or environment near the respective cellular location tracking device on a computer display simultaneously.

21. The system of claim 20, wherein the computer display further comprises a map.

22. The system of claim 20, wherein the plurality of cellular location tracking devices each located remotely from each other is each also associated with a different cellular tower of a cellular service network.

23. The system of claim 20, each of the plurality of cellular location tracking devices comprises at least one of a SIM chip, a global positioning system locator and a cellular chip.

24. The system of claim 20, wherein the user interface is further configured to allow the user to temporarily associate the cellular access registration number and its attendant cellular service to each of the plurality of cellular location tracking devices one at a time on a scheduled basis.

* * * * *